3,238,142
ANTIFOAMING COMPOSITION

Allen Capus Perry, Bartow, Fla., assignor to American Cyanamid Company, Stamford, Conn., a corporation of Maine
No Drawing. Filed Oct. 16, 1963, Ser. No. 316,536
5 Claims. (Cl. 252—358)

The present invention relates to novel defoaming compositions. More particularly, the invention relates to compositions containing as the major component thereof, a tall oil and as the minor component, an ethoxylated emulsifying agent hereinbelow defined.

As is known, tall oil and other substances, such as pine oil, fuel oil and red oil, have been employed as defoaming agents in various applications. One important application has been in the manufacture of wet process phosphoric acid to prevent or reduce the amount of foaming within digestion reactors and in evaporators. Unfortunately, the amount of either tall oil or other substances required to accomplish this desired result when utilizing phosphate rock of high oragnic content has been excessively high and, therefore, commercially unattractive. If a defoaming composition could be provided which would improve the defoaming action of tall oil alone while simultaneously reducing the quantity employed, such a composition would constitute a distinct advance in the art.

It is therefore, an object of the invention to provide a composition which possesses the defoaming attributes of tall oil while accomplishing this result in lesser quantities. It is a further object of the invention to provide a defoaming composition which is substantially superior to the use of tall oil alone. Other objects and advantages will become apparent from a consideration of the ensuing description.

To this end, it has been unexpectedly found that the incorporation of a small or minor amount of an ethoxylated lower alkanol into a major amount of tall oil substantially enhances the defoaming action of the overall composition. Surprisingly, an ethoxylated ethanol, an ethoxylated propanol or an ethoxylated butanol, containing from four to six ethoxy groups when incorporated into a tall oil, improves the latter's defoaming property to the extent of at least 400 percent, or more.

According to the present invention, a major amount of a defoaming agent, such as tall oil, red oil, fuel oil or pine oil, is employed along with a minor amount of an ethoxylated alkanol containing from four to six ethylene oxide residues per molecule. The oil employed can either be in the crude or refined state. Thus, for instance, a tall oil can be in the crude form, that is, one containing approximately equal amounts of unsaturated fatty acids and rosin and a small quantity of unsaponifiables, or a refined tall oil containing a major proportion of fatty acids and a minor amount of rosin and unsaponifiables. For best over-all results, it has been found that refined tall oil should be employed.

Ethoxylated alkanols containing from four to six ethoxy groups are prepared in the usual fashion. Thus, for instance, four mols of ethylene oxide are reacted with one mol of ethanol to produce an ethoxylated ethanol to contain four ethylene oxide residues per molecule. The amount of ethoxylated compound employed in the preparation of the composition ranges from 10 percent to 25 percent, and, preferably, from 15 percent to 20 percent, based on the weight of the over-all composition. Advantageously, the ethoxylated compound is added to the tall oil at room temperature, or slightly above, if preferred.

To further illustrate the present invention, the following examples are presented for purposes of illustrating certain more specific details thereof. These examples are not to be taken as limitative of the invention. Unless otherwise noted, all parts are by weight.

Example 1

In a suitable mixing vessel, 85 parts of a refined tall oil containing 80% fatty acids, 15% rosin and 5% unsaponifiables are added to and admixed with 15 parts of ethoxylated ethanol containing an average of five ethylene oxide residues per molecule. Resultant non-ionic, non-emulsion is then withdrawn from the mixing vessel.

Example 2

Example 1 is repeated in every detail, except that 80 parts of the refined tall oil therein and 20 parts of ethylene oxide-ethanol condensate containing an average of five ethylene oxide residues per molecule are admixed. The resultant composition is substantially free-flowing and highly effective as defoamer.

Example 3

The procedure of Example 1 is repeated in every detail, except that crude tall oil is employed in lieu of the refined tall oil. A viscous anti-foaming composition is obtained.

Example 4

The procedure of Example 2 is repeated in every detail, except that isopropanol-ethylene oxide condensate containing an average of six ethylene oxide residues per molecule is employed.

Example 5

To determine the effectiveness of the foam inhibiting properties of the compositions defined in each of the above examples, 300 parts of a concentrated sulfuric acid-digested phosphate rock mixture are initially aerated. A foam is readily discernible during aeration. Employing tall oil alone, as much as 0.50 part of tall oil does not prevent foaming during aeration. On the other hand, it requires no more than 0.10 part of each of the compositions set forth above to prevent foaming. In utilizing the compositions of Examples 2 and 4, it requires no more than 0.08 part to prevent foaming.

Example 6

In a series of experiments to further illustrate the foam inhibition properties of the compositions of the invention, 500 parts of phosphate rock in 1200 parts of dilute phosphoric acid and 432 parts of concentrated sulfuric acid are added to a suitable reactor. To the latter mixture is then added tall oil alone. It is found that 3.2 parts of tall oil are required to prevent foaming during the digestion of the phosphate rock mixture. On the other hand, it requires 0.9 part utilizing the compositions of Examples 1 and 3, respectively, and 0.7 part of the compositions defined in Examples 2 and 4, respectively.

I claim:

1. A composition for the inhibition of foam which consists essentially of a major proportion of an oil selected from the group consisting of tall oil, red oil and pine oil, and a minor proportion of an ethoxylated lower alkanol selected from the group consisting of ethoxylated ethanol, ethoxylated propanol and ethoxylated butanol and containing from four to six ethylene oxide residues per molecule, said ethoxylated lower alkanol being present in amounts ranging from about 10% to about 25%.

2. A composition according to claim 1, in which the lower alkanol is ethanol.

3. A composition according to claim 1, in which the lower alkanol is propanol.

4. A composition according to claim 1, in which the ethylene oxide-lower alkanol condensate contains five ethylene oxide residues per molecule.

5. A composition according to claim 1, in which the oil is tall oil.

References Cited by the Examiner

UNITED STATES PATENTS

| | | | |
|---|---|---|---|
| 2,209,591 | 7/1940 | Barnes | 252—8.5 |
| 2,530,953 | 11/1950 | Fuqua | 252—321 |
| 2,575,298 | 11/1951 | Ryznar | 252—321 |
| 2,868,734 | 1/1959 | De Castro et al. | 252—358 |
| 3,076,768 | 2/1963 | Boylan | 252—358 |

FOREIGN PATENTS 803,544  10/1958  Great Britain.

ALBERT T. MEYERS, *Primary Examiner.*

JULIUS GREENWALD, *Examiner.*

H. B. GUYNN, *Assistant Examiner.*